(12) United States Patent
Borran et al.

(10) Patent No.: US 8,737,360 B2
(45) Date of Patent: May 27, 2014

(54) POWER CONTROL AND HANDOFF WITH POWER CONTROL COMMANDS AND ERASURE INDICATIONS

(71) Applicant: QUALCOMM Incorporated, San Diego, CA (US)

(72) Inventors: Mohammad J. Borran, San Diego, CA (US); Aamod Khandekar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/654,329

(22) Filed: Oct. 17, 2012

(65) Prior Publication Data

US 2013/0040647 A1    Feb. 14, 2013

Related U.S. Application Data

(62) Division of application No. 11/620,037, filed on Jan. 4, 2007, now Pat. No. 8,315,226.

(60) Provisional application No. 60/756,981, filed on Jan. 5, 2006.

(51) Int. Cl.
*H04W 36/30* (2009.01)

(52) U.S. Cl.
USPC ........... 370/332; 455/436; 455/437; 455/522; 370/318; 370/331; 370/333

(58) Field of Classification Search
USPC .......... 455/436–444, 522, 127.1, 127.5, 13.4; 370/318, 320, 331–335, 342
See application file for complete search history.

(56) References Cited

U.S. PATENT DOCUMENTS 5,491,717 A * 2/1996 Hall .............................. 370/332
5,982,760 A    11/1999 Chen (Continued)

FOREIGN PATENT DOCUMENTS

JP    2000267962       9/2000
JP    2001511330 A     8/2001

(Continued)

OTHER PUBLICATIONS

European Search Report—EP08014430, Search Authority—Munich—Oct. 6, 2008.

(Continued)

*Primary Examiner* — Allahyar Kasraian
(74) *Attorney, Agent, or Firm* — Mary A. Fales

(57) ABSTRACT

Techniques for performing power control and handoff are described. In an aspect, power control (PC) is supported with multiple PC modes such as an up-down PC mode and an erasure-based PC mode. One PC mode may be selected for use. Signaling may be sent to indicate the selected PC mode. If the up-down PC mode is selected, then a base station estimates the received signal quality for a terminal and sends PC commands to direct the terminal to adjust its transmit power. If the erasure-based PC mode is selected, then the base station sends erasure indications that indicate whether codewords received from the terminal are erased or non-erased. For both PC modes, the terminal adjusts its transmit power based on the power control feedback (e.g., PC commands and/or erasure indications) to achieve a target level of performance (e.g., a target erasure rate for the codewords). The erasure indications may also be used for handoff.

21 Claims, 10 Drawing Sheets

(56) References Cited

U.S. PATENT DOCUMENTS

| | | | |
|---|---|---|---|
| 5,987,326 A | 11/1999 | Tiedemann, Jr. et al. | |
| 6,075,974 A | 6/2000 | Saints et al. | |
| 6,185,432 B1 | 2/2001 | Vembu | |
| 6,188,678 B1 | 2/2001 | Prescott | |
| 6,259,928 B1 | 7/2001 | Vembu | |
| 6,301,485 B1 | 10/2001 | Lee | |
| 6,449,463 B1 | 9/2002 | Schiff | |
| 6,515,975 B1 | 2/2003 | Chheda et al. | |
| 6,697,634 B1 | 2/2004 | Hayashi | |
| 6,876,866 B1 | 4/2005 | Ulupinar et al. | |
| 7,239,847 B2 | 7/2007 | Attar et al. | |
| 7,286,499 B2 | 10/2007 | Tiedemann, Jr. | |
| 7,313,398 B1 | 12/2007 | Ramahi | |
| 8,315,226 B2 | 11/2012 | Borran et al. | |
| 2001/0040880 A1 | 11/2001 | Chen et al. | |
| 2002/0196752 A1* | 12/2002 | Attar et al. | 370/331 |
| 2003/0050084 A1 | 3/2003 | Damnjanovic et al. | |
| 2003/0081572 A1* | 5/2003 | Kim et al. | 370/332 |
| 2003/0134655 A1 | 7/2003 | Chen et al. | |
| 2003/0204615 A1 | 10/2003 | Wei et al. | |
| 2005/0009551 A1 | 1/2005 | Tsai et al. | |
| 2005/0032522 A1 | 2/2005 | Soong et al. | |
| 2005/0070322 A1 | 3/2005 | Tayloe et al. | |
| 2005/0096050 A1 | 5/2005 | Hidaka | |
| 2005/0208959 A1* | 9/2005 | Chen et al. | 455/515 |
| 2005/0282574 A1 | 12/2005 | Li et al. | |
| 2005/0283715 A1* | 12/2005 | Sutivong et al. | 714/790 |
| 2006/0166673 A1* | 7/2006 | Vasudevan | 455/439 |
| 2007/0082620 A1* | 4/2007 | Zhang et al. | 455/69 |

FOREIGN PATENT DOCUMENTS

| | | |
|---|---|---|
| JP | 2001517049 A | 10/2001 |
| JP | 2003523689 | 8/2003 |
| KR | 2001031098 A | 4/2001 |
| KR | 2001109040 A | 12/2001 |
| KR | 2005040801 A | 5/2005 |
| KR | 2005068430 A | 7/2005 |
| RU | 2251800 | 5/2005 |
| WO | 9835525 | 8/1998 |
| WO | 9914975 | 3/1999 |
| WO | 0161884 | 8/2001 |
| WO | 03017525 A1 | 2/2003 |
| WO | 03039042 A1 | 5/2003 |
| WO | 2006069296 | 6/2006 |

OTHER PUBLICATIONS

European Written Opinion—EP08014430, Search Authority—Munich—Oct. 6, 2008.

IEEE 802.16, "Part 16: Air Interface for Fixed and Mobile Broadband Wireless Access Systems; Amendment 2: Physical and Medium Access Control Layers for Combined Fixed and Mobile Operation in Licensed Brands; Corrigendum 1", Section 6.3.2.3.58 & 6.3.2.3.59 IEEE Computer Society and the IEEE Microwave Theory and Techniques Society, Feb. 28, 2005.

International Search Report—PCT/US07/060194—International Search Authority, European Patent Office, May 30, 2008.

QUALCOMM Incorporated: QFDD Technology Overview Presentation, IEEE 802.20 Working Group on Mobile Broadband Wireless Access, C802.20-05-59, Nov. 2005, XP002518168, Retrieved from Internet: URL:http://grouper.ieee.org/groups/802/20/Contributions.html, pp. 45-47, Oct. 28, 2005.

Taiwan Search Report—TW096100623—TIPO—Mar. 5, 2012.

Tomcik J., "QFDD and QTDD:Technology Overview", IEEE 802.20 Working Group on Mobile Broadband Wireless Access, XP002480491, Oct. 28, 2005, pp. 1, 61-106, Retrieved from Internet: URL: http://grouper.iee.org/groups/802/20/Contributions.html.

Tomcik, Jim: "QFDD Technology Overview Presentation," IEEE 802.20 Working Group on Mobile Broadband Wireless Access, [Online] Nov. 15, 2005, pp. 1-73, XP002467626.

Written Opinion—PCT/US07/060194—International Search Authority, European Patent Office, May 30, 2008.

\* cited by examiner

POWER CONTROL AND HANDOFF WITH POWER CONTROL COMMANDS AND ERASURE INDICATIONS

The present application claims priority to provisional U.S. Application Ser. No. 60/756,981, entitled "METHOD OF CONTROL WITH UP/DOWN COMMANDS AND ERASURE INDICATIONS," filed Jan. 5, 2006, assigned to the assignee hereof and incorporated herein by reference.

The present application for patent is a divisional and claims priority from Utility patent application Ser. No. 11/620,037 filed Jan. 4, 2007, entitled "Power Control and Handoff with Power Control Commands and Erasure Indications," and is assigned to the assignee hereof and hereby expressly incorporated by reference herein.

BACKGROUND

I. Field

The present disclosure relates generally to communication, and more specifically to techniques for performing power control and handoff in a wireless communication system.

II. Background

A wireless multiple-access communication system can support communication for multiple wireless terminals by sharing the available system resources, e.g., bandwidth and transmit power. Each terminal may communicate with one or more base stations via transmissions on the forward and reverse links. The forward link (or downlink) refers to the communication link from the base stations to the terminals, and the reverse link (or uplink) refers to the communication link from the terminals to the base stations.

Multiple terminals may simultaneously receive data on the forward link and/or transmit data on the reverse link. This may be achieved by multiplexing the transmissions on each link to be orthogonal to one another in time, frequency and/or code domain. On the reverse link, complete orthogonality, if achieved, results in the transmission from each terminal not interfering with the transmissions from other terminals at a receiving base station. However, complete orthogonality among the transmissions from different terminals is often not realized due to channel conditions, receiver imperfections, and so on. The loss in orthogonality results in each terminal causing some interference to other terminals communicating with the same base station. Furthermore, the transmissions from terminals communicating with different base stations are typically not orthogonal to one another. Thus, each terminal may also cause interference to other terminals communicating with nearby base stations. The performance of each terminal is degraded by the interference from all other terminals in the system.

There is therefore a need in the art for techniques to control the transmit power of the terminals to reduce interference and achieve good performance for all terminals.

SUMMARY

Techniques for efficiently performing power control and handoff are described herein. In an aspect, power control (PC) is supported with multiple PC modes such as an up-down PC mode and an erasure-based PC mode. One PC mode may be selected for use, e.g., based on the desired performance. Signaling (e.g., a PC mode bit) may be sent to indicate the selected PC mode. If the up-down PC mode is selected, then a base station estimates the received signal quality for a terminal and sends PC commands to direct the terminal to adjust its transmit power. If the erasure-based PC mode is selected, then the base station detects codewords received from the terminal and sends erasure indications that indicate whether these codewords are erased or non-erased. For both PC modes, the terminal adjusts its transmit power based on the power control feedback (e.g., PC commands and/or erasure indications) to achieve a target level of performance (e.g., a target erasure rate for the codewords sent by the terminal).

In another aspect, power control is achieved based on PC commands, and handoff is achieved based on erasure indications. A terminal transmits codewords on the reverse link. A first set of at least one base station estimates the received signal quality for the terminal, e.g., based on the codewords received from the terminal, and generates PC commands based on the received signal quality. A second set of at least one base station generates erasure indications for the codewords received from the terminal. The first set may include only a serving base station. The second set may include the serving base station and possibly other base stations. The terminal adjusts its transmit power based on the PC commands received from the first set of base station(s). The terminal may determine the erasure rate for each base station in the second set, select the base station with the lowest erasure rate, and perform handoff to the selected base station.

Various aspects and features of the disclosure are described in further detail below.

DETAILED DESCRIPTION

Figure 1:
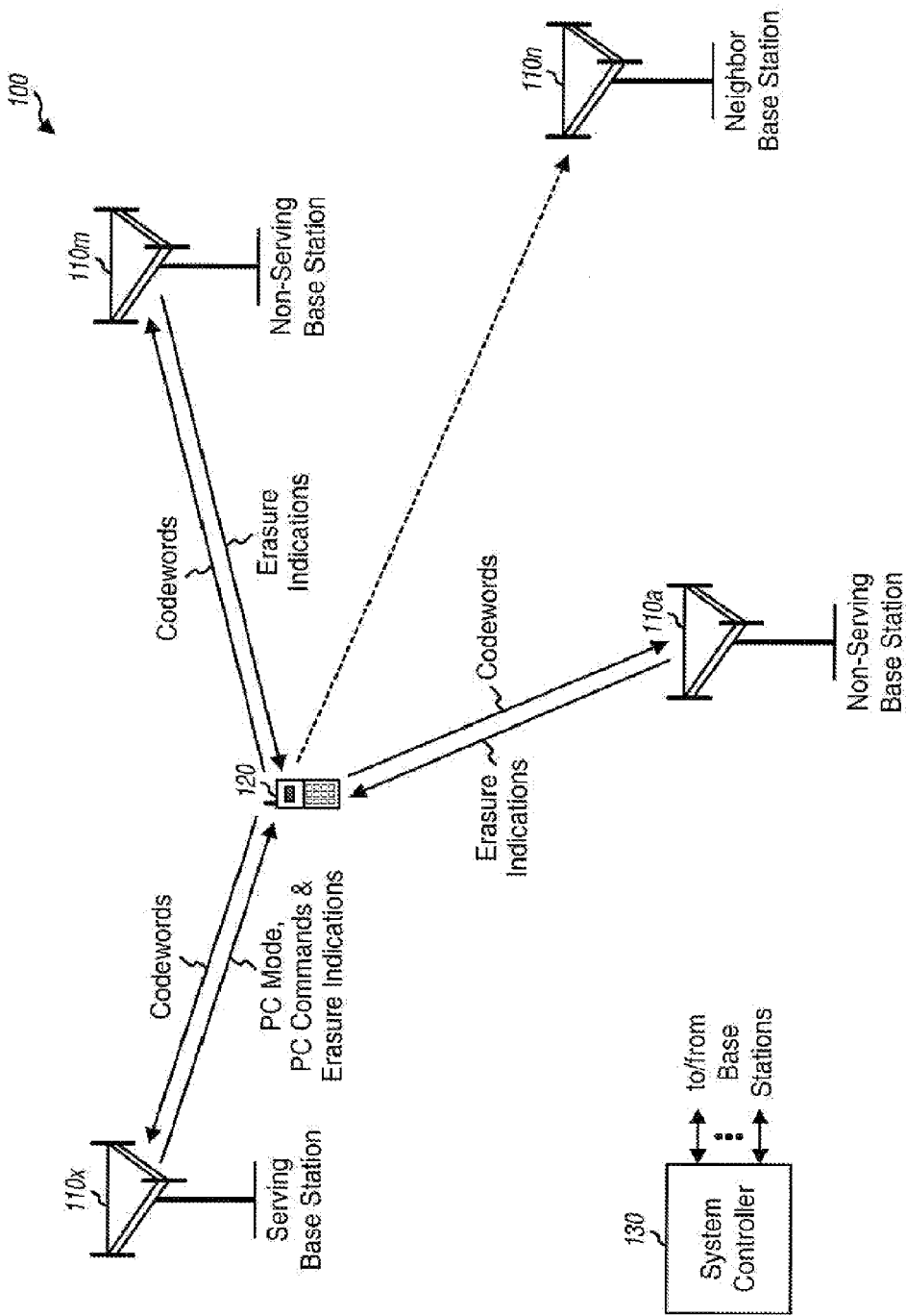
FIG. 1 shows a wireless communication system.

FIG. 1 shows a wireless communication system 100 with multiple base stations 110. A base station is a station that communicates with the terminals. A base station may also be called, and may contain some or all of the functionality of an access point, a Node B, and/or some other network entity. Each base station provides communication coverage for a particular geographic area. The term "cell" can refer to a base station and/or its coverage area depending on the context in which the term is used. To improve system capacity, a base station coverage area may be partitioned into multiple (e.g., three) smaller areas. Each smaller area may be served by a respective base transceiver subsystem (BTS). The term "sector" can refer to a BTS and/or its coverage area depending on the context in which the term is used. For a sectorized cell, the BTSs for all sectors of that cell are typically co-located within the base station for the cell.

Terminals may be dispersed throughout the system, and each terminal may be fixed or mobile. For simplicity, only one terminal 120 is shown in FIG. 1. A terminal may also be called, and may contain some or all of the functionality of an access terminal (AT), a mobile station (MS), a user equipment (UE), and/or some other entity. A terminal may be a wireless device, a cellular phone, a personal digital assistant (PDA), a wireless modem, a handheld device, and so on. A terminal may communicate with zero, one, or multiple base stations on the forward and/or reverse link at any given moment.

For a centralized architecture, a system controller 130 couples to base stations 110 and provides coordination and control for the base stations. System controller 130 may be a single network entity or a collection of network entities. For a distributed architecture, the base stations may communicate with one another as needed.

The power control and handoff techniques described herein may be used for various wireless communication systems and various radio technologies such as Code Division Multiple Access (CDMA), Time Division Multiple Access (TDMA), Frequency Division Multiple Access (FDMA), Orthogonal FDMA (OFDMA), Single-Carrier FDMA (SC-FDMA), etc. OFDMA utilizes Orthogonal Frequency Division Multiplexing (OFDM), and SC-FDMA utilizes Single-Carrier Frequency Division Multiplexing (SC-FDM). OFDM and SC-FDM partition a frequency band (e.g., the system bandwidth) into multiple orthogonal subcarriers, which are also called tones, bins, and so on. Each subcarrier may be modulated with data. In general, modulation symbols are sent in the frequency domain with OFDM and in the time domain with SC-FDM. The techniques may also be used for wireless communication systems that utilize multiple radio technologies (e.g., CDMA and OFDMA).

The techniques described herein may also be used for systems with sectorized cells as well as systems with unsectorized cells. For clarity, the techniques are described below for a system with sectorized cells. In the following description, the terms "base station" and "sector" are used interchangeably, and the terms "terminal" and "user" are also used interchangeably.

Terminal 120 may transmit data, signaling, pilot and/or other content on the reverse link. Transmission on the reverse link may be supported in various manners, depending on the system design. In one design, an active set is maintained for the terminal and includes one or more sectors that may serve the terminal on the reverse link. Sectors may be added to or removed from the active set based on signal quality measurements, which may be made by the terminal and/or the sectors. One sector in the active set may be designed as a reverse link (RL) serving sector for the terminal. The serving sector may perform various functions (e.g., scheduling, data decoding, power control, and so on) to support reverse link transmission for the terminal. The remaining sectors (if any) in the active set may be referred to as active set non-serving sectors. The non-serving sectors may perform various functions (e.g., feedback reporting) to assist in the selection of the serving sector.

As shown in FIG. 1, the transmission from terminal 120 may be received by any number of sectors. These sectors may include serving sector 110x, non-serving sectors 110a through 110m, and other sectors (e.g., neighbor sector 110n) that are not in the active set of the terminal. The transmission from terminal 120 may cause interference to other terminals transmitting to the same serving sector 110x as well as other terminals transmitting to other sectors, e.g., sectors 110a through 110n. Hence, it is desirable to control the transmit power of terminal 120 such that the desired performance is achieved for terminal 120 while reducing interference to other terminals.

1. RL Power Control

Reverse link (RL) power control refers to control of transmit power of a terminal on the reverse link. In general, RL power control may be achieved based on any RL transmission that allows the sectors to estimate the signal quality of the reverse link for the terminal. The RL transmission may be for pilot, data, signaling, or any combination thereof. To achieve good power control performance, the RL transmission should be sent regularly so that the transmit power of the terminal can be adjusted at a sufficiently fast rate to track changes in the channel conditions.

In one design, RL power control is achieved based on codewords sent on a control channel by a terminal. In general, the codewords may be for various types of information. In one design, the codewords are for channel quality indication (CQI) reports sent on a CQI channel. A terminal may make signal quality measurements for the sectors in the active set, generate CQI reports for these measurements, and transmit the CQI reports on the CQI channel, e.g., to the serving sector. The CQI reports may be used to select a suitable sector to serve the terminal on the forward link. In other designs, the codewords may be for other types of information.

A CQI report (or a signaling message) may be a small word containing L bits, where in general $L \geq 1$. This word may be mapped to one of $2^L$ possible codewords in a codebook. The codeword is then sent on the CQI channel. The same number of bits (e.g., L bits) may be sent for each CQI report. In this case, the same codebook may be used for each CQI report. Alternatively, different numbers of bits may be sent for different CQI reports, and different codebooks may be used depending on the number of bits being sent. The codewords in a given codebook may be generated based on a block code or some other mapping scheme. In one design, the $2^L$ possible codewords are formed by $2^L$ different Walsh codes of length $2^L$. A specific Walsh code may be sent as a codeword for an L-bit CQI report.

In an aspect, RL power control is supported with multiple PC modes. The PC modes may also be referred to as PC schemes, PC mechanisms, PC algorithms, and so on. In one design, the multiple PC modes include an up-down PC mode and an erasure-based PC mode. In the up-down PC mode, a sector (e.g., the serving sector) estimates the received signal quality for a terminal and sends PC commands/bits to direct the terminal to adjust its transmit power. In the erasure-based PC mode, a sector (e.g., the serving sector) sends erasure indications/bits that indicate the results of erasure detection at the sector for codewords received from the terminal. For both PC modes, the terminal adjusts its transmit power based on the power control feedback (e.g., PC commands and/or erasure indications) to achieve a target level of performance, which may be quantified by a target erasure rate and/or some other measures.

Figure 2:
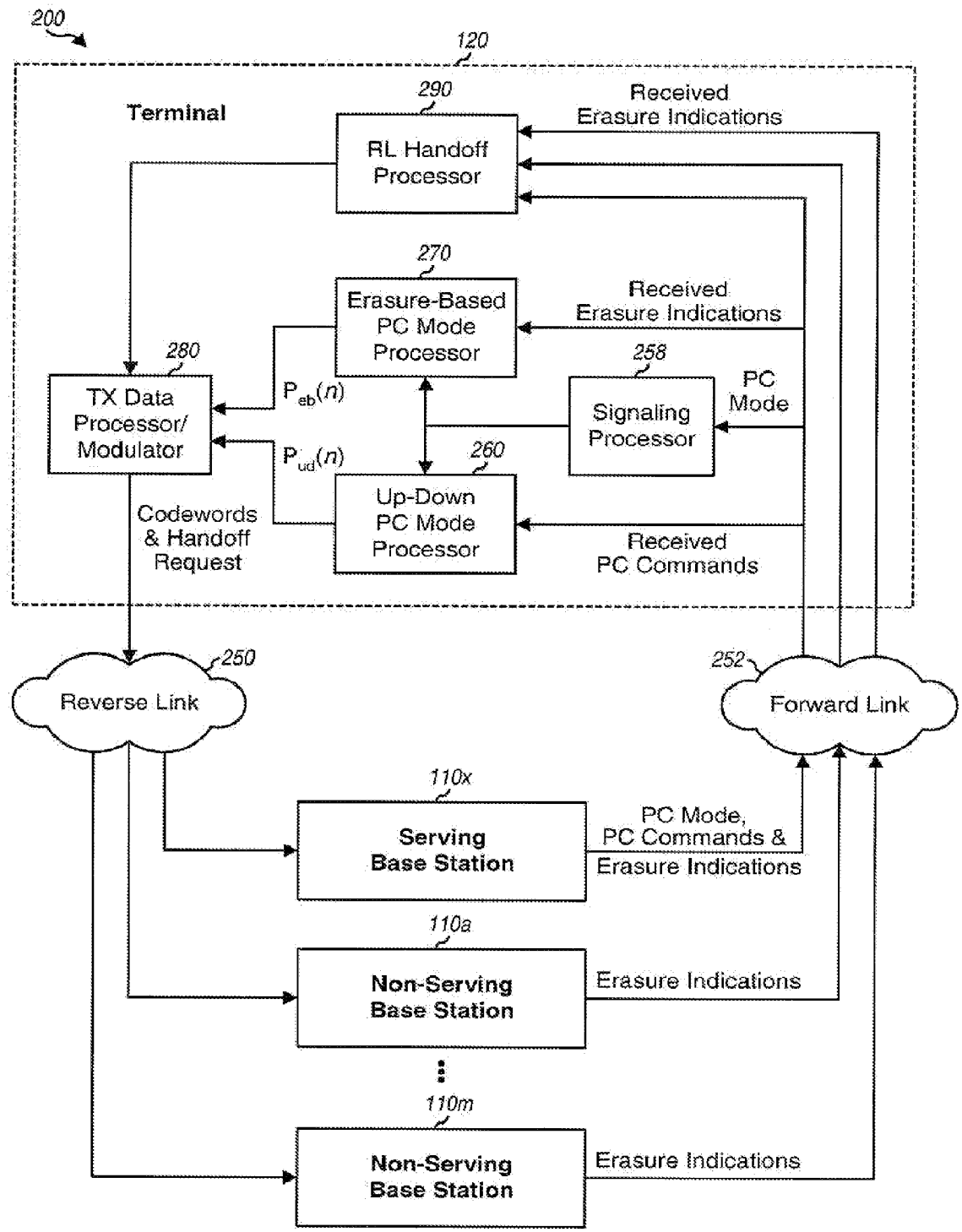
FIG. 2 shows a power control mechanism supporting multiple PC modes.

FIG. 2 shows a design of a power control mechanism 200 that supports the up-down PC mode and the erasure-based PC mode. In this design, serving sector 110x sends to terminal 120 signaling that indicates the PC mode to use for RL power control. In one design, this signaling is an RLCtrlPCMode bit that may be set to either '0' to indicate the erasure-based PC mode or '1' to indicate the up-down PC mode. The signaling may be sent at the start of a communication session, whenever there is a change in PC mode, and so on. In another design, sector 110x broadcasts the PC mode supported by the sector to all terminals within its coverage area. In any case, a signaling processor 258 at terminal 120 receives the signaling from serving sector 110$x$ and provides a mode control that indicates whether to use the up-down PC mode or the erasure-based PC mode.

If the up-down PC mode is selected, then serving sector 110$x$ periodically estimates the received signal quality for terminal 120 and sends PC commands via the forward link (cloud 252) to terminal 120. Each PC command may be either (1) an UP command to direct an increase in transmit power or (2) a DOWN command to direct a decrease in transmit power. At terminal 120, an up-down PC mode processor 260 receives the PC commands from serving sector 110$x$, adjusts the transmit power of terminal 120 based on the received PC commands, and provides transmit power level $P_{ud}(n)$ to a transmit (TX) data processor/modulator 280. Processor 280 transmits codewords at transmit power of $P_{ud}(n)$ on the reverse link (cloud 250) to serving sector 110$x$ and non-serving sectors 110$a$ through 110$m$.

Sectors 110$x$ and 110$a$ through 110$m$ receive the codewords from terminal 120. Each sector 110 decodes each received codeword and performs erasure detection to determine whether the decoding result meets a desired level of confidence. A received codeword may be deemed (1) "erased" if the decoding result does not meet the desired level of confidence or (2) "non-erased" if the decoding result meets the desired level of confidence. Each sector 110 sends erasure indications to terminal 120. An erasure indication may indicate whether a received codeword is erased or non-erased.

If the erasure-based PC mode is selected, then the erasure indications from serving sector 110$x$ are used for RL power control. At terminal 120, an erasure-based PC mode processor 270 receives the erasure indications from serving sector 110$x$, adjusts the transmit power of terminal 120 based on the received erasure indications, and provides transmit power level $P_{eb}(n)$ to TX data processor 280. Processor 280 then transmits codewords at transmit power of $P_{eb}(n)$.

In the design shown in FIG. 2, RL power control is performed based solely on power control feedback from serving sector 110$x$. This feedback may comprise PC commands in the up-down PC mode and erasure indications in the erasure-based PC mode. This design may simplify RL power control since the transmit power of terminal 120 is adjusted based on feedback from one source.

RL power control may also be performed based on feedback from multiple sectors. In another design of the up-down PC mode, multiple sectors may estimate the received signal quality for terminal 120 and send PC commands to the terminal. Terminal 120 may then adjust its transmit power based on the PC commands received from all sectors. Terminal 120 may apply an OR-of-the-down rule and may reduce its transmit power whenever any sector sends a DOWN command. Terminal 120 may also combine the received PC commands in other manners. In another design of the erasure-based PC mode, terminal 120 may adjust its transmit power based on the erasure indications received from multiple sectors. In yet another design, a hybrid PC mode may be supported, and terminal 120 may adjust its transmit power based on a combination of PC commands and erasure indications. RL power control may also be performed in other manners.

In one design, the active set includes the serving and non-serving sectors, as described above. In another design, the active set may include multiple synchronous subsets. The serving sector may be selected from one of the synchronous subsets, and the best sector in each remaining synchronous subset (if any) may be identified, e.g., based on the erasure rate for the sector. The terminal may respond to feedback (e.g., PC commands and/or erasure indications) from the serving sector as well as feedback from the best sector in each remaining synchronous subset. To avoid possible ambiguities, each sector may use the up-down PC mode for terminals being served by that sector on the reverse link and may use the erasure-based PC mode for other terminals having that sector in their active sets.

In another aspect, RL handoff for a terminal is supported based on erasure indications sent by the serving and non-serving sectors. Handoff or handover refers to the process of being handed off from one serving sector to another serving sector. On the reverse link, different sectors typically observe different received signal qualities for the terminal due to different path losses and/or interference levels. It is desirable for the sector observing the best received signal quality to serve the terminal. In general, the sectors may estimate the received signal quality for the terminal based on any transmission sent by the terminal. However, if the terminal is already transmitting codewords for other purposes, then the sectors may efficiently use these codewords to estimate the received signal quality for the terminal. The erasure indications sent by the sectors would then represent feedback indicating the received signal quality measured by the sectors for the terminal. The terminal may use the erasure indications to select the best sector to serve the terminal on the reverse link.

In the design shown in FIG. 2, an RL handoff processor 290 receives the erasure indications from serving sector 110$x$ as well as non-serving sector 110$a$ through 110$m$. Processor 290 identifies the sector observing the best received signal quality for terminal 120 based on the received erasure indications, as described below. Processor 290 may generate a handoff request if another sector observes better received signal quality for terminal 120 than the current serving sector.

In one design, RL power control may be performed based on PC commands, and RL handoff may be performed based on erasure indications. In another design, RL power control and handoff may both be performed based on erasure indications. In other designs, RL power control and handoff may be performed based on other feedback from the sectors.

The up-down PC mode and the erasure-based PC mode may be implemented in various manners. Exemplary designs for the two PC modes are described below.

Figure 3:
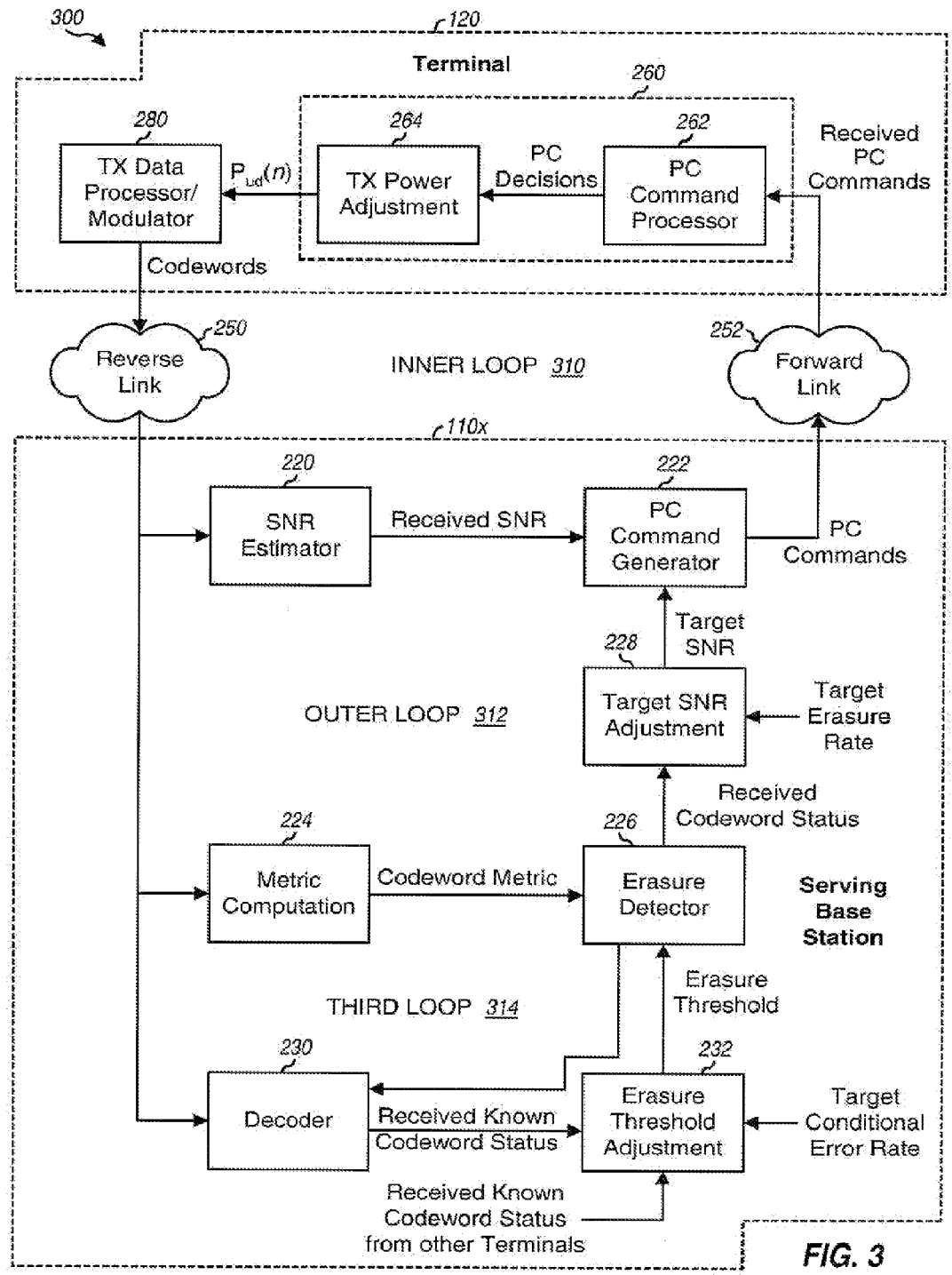
FIG. 3 shows a power control mechanism for the up-down PC mode.

FIG. 3 shows a design of a power control mechanism 300 for the up-down PC mode. Power control mechanism 300 includes an inner loop 310, an outer loop 312, and a third loop 314. Inner loop 310 operates between serving sector 110$x$ and terminal 120. Outer loop 312 and third loop 314 are maintained by serving sector 110$x$. At terminal 120, inner loop 310 is supported by up-down PC mode processor 260, which includes a PC command processor 262 and a TX power adjustment unit 264.

Inner loop 310 adjusts the transmit power of terminal 120 to maintain the received signal quality close to a target signal quality at serving sector 110$x$. Signal quality may be quantified by a signal-to-noise ratio (SNR), a signal-to-noise-and-interference ratio (SINR), a carrier-to-interference ratio (C/I), an energy-per-symbol-to-noise ratio (Es/No), and so on. For clarity, SNR is used to denote signal quality in the description below. At serving sector 110$x$, an SNR estimator 220 estimates the received SNR of terminal 120 (e.g., based on the control channel carrying the codewords) and provides the received SNR. SNR estimator 220 may average SNR estimates over multiple frames to obtain an improved estimate of the received SNR. SNR estimator 220 may also discard SNR estimates for frames in which the received codewords are erased. A PC command generator 222 obtains the received SNR and a target SNR, compares the received SNR against the target SNR, and generates PC commands, as follows:

If $SNR_{rx}(n) < SNR_{target}$, then PC command=UP command, else

If $SNR_{rx}(n) \geq SNR_{target}$, then PC command=DOWN command, Eq (1)

where $SNR_{rx}(n)$ is the received SNR in frame n and $SNR_{target}$ is the target SNR. Serving sector 110x transmits the PC commands to terminal 120.

At terminal 120, PC command processor 262 receives the PC commands sent by serving sector 110x and makes a decision on each received PC command. A PC decision may be either an UP decision if the received PC command is deemed to be an UP command or a DOWN decision if the received PC command is deemed to be a DOWN command. Adjustment unit 264 may then adjust the transmit power of terminal 120 based on the PC decisions from processor 262, as follows:

$$P_{ud}(n+1) = \begin{cases} P_{ud}(n) + \Delta P & \text{for an UP decision,} \\ P_{ud}(n) - \Delta P & \text{for a DOWN decision,} \end{cases} \quad \text{Eq (2)}$$

where $P_{ud}(n)$ is the transmit power in frame n, and $\Delta P$ is the step size for adjusting the transmit power in the up-down PC mode.

The transmit power $P_{ud}(n)$ and the step size $\Delta P$ are given in units of decibels (dB). In the design shown in equation (2), the transmit power is increased or decreased by the same step size (e.g., 0.5 dB, 1.0 dB, or some other value), which may be selected to provide good performance for RL power control. In another design, the transmit power is adjusted by different up and down step sizes. The transmit power $P_{ud}(n)$ may also be maintained at the same level if a received PC command is deemed to be too unreliable. Processor 280 generates codewords and transmits these codewords at transmit power of $P_{ud}(n)$ to serving sector 110x and non-serving sectors 110a through 110m (not shown in FIG. 3).

Outer loop 312 adjusts the target SNR based on received codewords to achieve the target erasure rate for the codewords sent by terminal 120. At serving sector 110x, a metric computation unit 224 computes a metric for each received codeword. An erasure detector 226 performs erasure detection for each received codeword based on the metric and an erasure threshold, as described below, and provides the status of each received codeword, which may be either erased or non-erased. A target SNR adjustment unit 228 obtains the status of each received codeword and, in one design, may adjust the target SNR, as follows:

$$SNR_{target}(k+1) = \begin{cases} SNR_{target}(k) + \Delta SNR_{up}, & \text{for an erased codeword,} \\ SNR_{target}(k) - \Delta SNR_{dn}, & \text{for a non-erased codeword,} \end{cases} \quad \text{Eq (1)}$$

where $SNR_{target}(k)$ is the target SNR in update interval k, $\Delta SNR_{up}$ is an up step size for the target SNR, and $\Delta SNR_{dn}$ is a down step size for the target SNR.

The target SNR and the up and down step sizes are given in units of dB.

The $\Delta SNR_{up}$ and $\Delta SNR_{dn}$ step sizes may be set as follows:

$$\Delta SNR_{up} = \Delta SNR_{dn} \cdot \left( \frac{1 - Pr_{erasure}}{Pr_{erasure}} \right), \quad \text{Eq (4)}$$

where $Pr_{erasure}$ is the target erasure rate. As an example, if the target erasure rate is 10%, then the up step size is 9 times the down step size. If the up step size is 0.5 dB, then the down step size is approximately 0.056 dB.

In another design, serving base station 110x measures the erasure rate over a window of erased codewords and adjusts the target SNR based on the difference between the measured erasure rate and the target erasure rate. The target SNR may be adjusted using equal or different up and down step sizes.

In one design, the erasure threshold is fixed, and a suitable threshold value may be determined based on computer simulation, empirical measurements, and/or some other means. In another design, the erasure threshold is adjusted with a closed loop to achieve a target conditional error rate $Pr_{error}$ for the codewords. The conditional error rate is the probability of error conditioned on non-erased codewords, which means: given that a received codeword is declared to be non-erased, the probability of the received codeword being decoded in error is $Pr_{error}$. A low $Pr_{error}$ (e.g., 1% or 0.1%) corresponds to high degree of confidence in the decoding result when a non-erased codeword is declared.

Third loop 314 adjusts the erasure threshold based on received known codewords to achieve the target conditional error rate. Terminal 120 may transmit a known codeword periodically or whenever directed. At serving sector 110x, metric computation unit 224 and erasure detector 226 perform erasure detection for each received known codeword in the same manner as for other received codewords. Erasure detector 226 provides the status of each received known codeword. A decoder 230 decodes each received known codeword deemed to be non-erased and provides the codeword status, which may be: (1) "erased", (2) "good" if the received known codeword is non-erased and decoded correctly, or (3) "bad" if the received known codeword is non-erased but decoded in error. In one design, an erasure threshold adjustment unit 232 may adjust the erasure threshold based on the status of the received known codewords, as follows:

$$TH_{erasure}(j+1) = \begin{cases} TH_{erasure}(j) - \Delta TH_{dn}, & \text{for a good codeword,} \\ TH_{erasure}(j) + \Delta TH_{up}, & \text{for a bad codeword, and} \\ TH_{erasure}(j) & \text{for an erased codeword,} \end{cases} \quad \text{Eq (2)}$$

where $TH_{erasure}(j)$ is the erasure threshold in update interval j, $\Delta TH_{up}$ is an up step size for the erasure threshold, and $\Delta TH_{dn}$ is a down step size for the erasure threshold.

The design in equation (5) assumes that a larger metric for a received codeword corresponds to higher degree of confidence. In this case, the erasure threshold is increased by $\Delta TH_{up}$ for each received known codeword that is "bad". The higher erasure threshold corresponds to a more stringent erasure detection criterion and results in a received codeword being more likely to be deemed erased, which in turn results in the received codeword being more likely to be decoded correctly when deemed to be non-erased. The erasure threshold is decreased by $\Delta TH_{dn}$ for each received known codeword that is "good" and is maintained for received known codewords that are erased.

The $\Delta TH_{up}$ and $\Delta TH_{dn}$ step sizes may be set as follows:

$$\Delta TH_{up} = \Delta TH_{dn} \cdot \left(\frac{1 - Pr_{error}}{Pr_{error}}\right). \quad \text{Eq (6)}$$

As an example, if the target conditional error rate is 1%, then the up step size is 99 times the down step size. The magnitude of $\Delta TH_{up}$ and $\Delta TH_{dn}$ may be selected based on the desired convergence rate for the third loop and/or other factors.

In another design, serving base station 110x measures the error rate (or a false alarm rate) and adjusts the erasure threshold based on the difference between measured error rate and a target error rate (or between the false alarm rate and a target false alarm rate). The erasure threshold may be adjusted with equal or different up and down threshold step sizes.

The erasure threshold may be adjusted in various manners. In one design, serving sector 110x maintains a separate third loop for each terminal and adjusts the erasure threshold to achieve the desired performance for that terminal. In another design, serving sector 110x maintains a single third loop for all terminals and adjusts the erasure threshold based on known codewords received from these terminals. In yet another design, serving sector 110x maintains a separate third loop for each group of terminals with similar performance and adjusts the erasure threshold based on known codewords received from all terminals in the group.

The erasure rate, conditional error rate, erasure threshold, and received SNR are typically related. For a given erasure threshold and a given received SNR, there exist a specific erasure rate and a specific conditional error rate. By changing the erasure threshold via third loop 314, a tradeoff may be made between the erasure rate and the conditional error rate.

Inner loop 310, outer loop 312, and third loop 314 may operate at different rates. Inner loop 310 may be updated whenever the received SNR is available. Outer loop 312 may be updated whenever a codeword is received. Third loop 314 may be updated whenever a known codeword is received. The update rates for the three loops may be selected to achieve the desired performance for RL power control.

Figure 4:
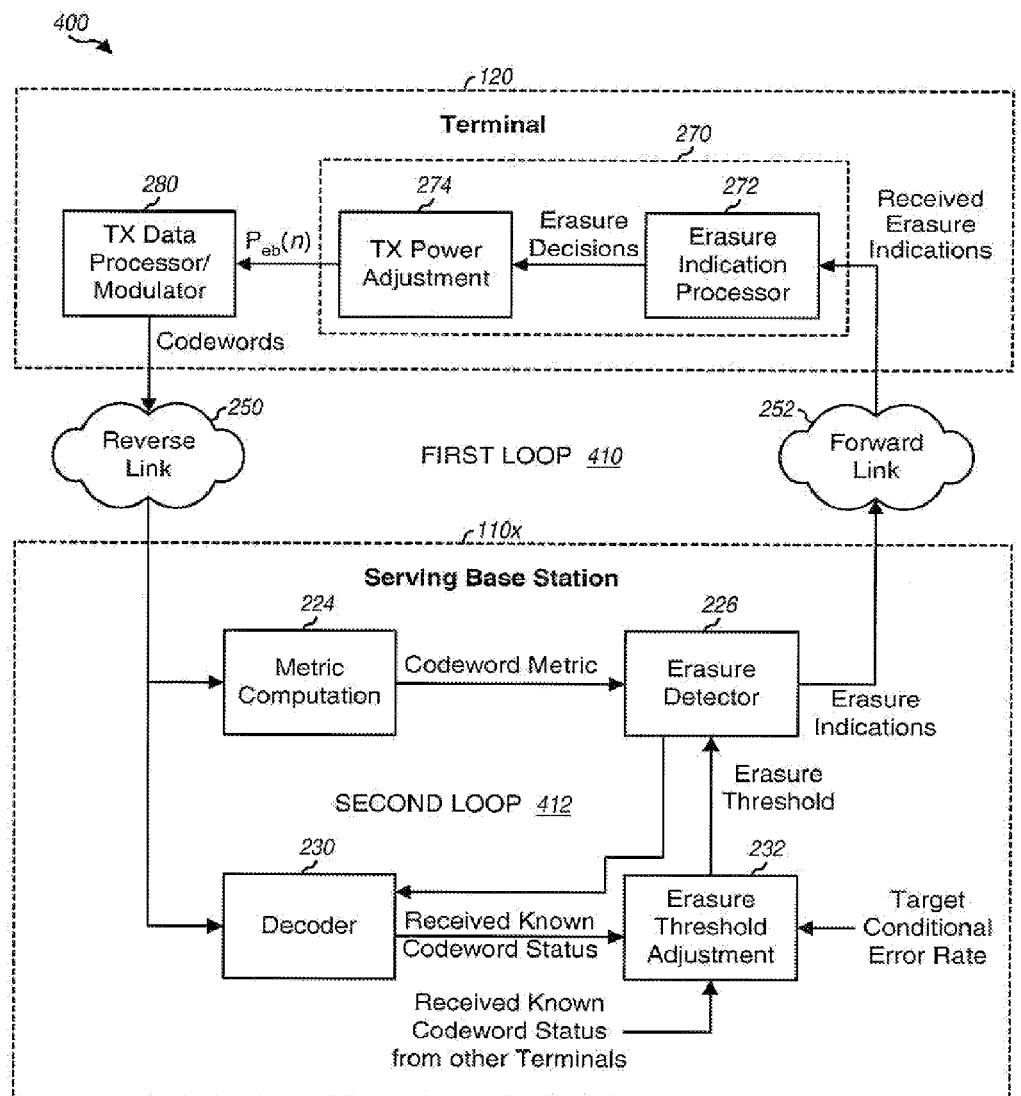
FIG. 4 shows a power control mechanism for the erasure-based PC mode.

FIG. 4 shows a design of a power control mechanism 400 for the erasure-based PC mode. Power control mechanism 400 includes a first loop 410 and a second loop 412. First loop 410 operates between serving sector 110x and terminal 120, and second loop 412 is maintained by serving sector 110x. At terminal 120, first loop 410 is supported by erasure-based PC mode processor 270, which includes an erasure indication processor 272 and a TX power adjustment unit 274.

First loop 410 adjusts the transmit power of terminal 120 to achieve the target erasure rate. At serving sector 110x, metric computation unit 224 computes the metric for each received codeword. Erasure detector 226 performs erasure detection for each received codeword based on the metric and the erasure threshold, as described below, and generates an erasure indication that indicates whether the received codeword is erased or non-erased. Serving sector 110x transmits the erasure indications to terminal 120.

At terminal 120, erasure indication processor 272 receives the erasure indications sent by serving sector 110x and makes a decision of erased or non-erased for each received erasure indication. Adjustment unit 274 may adjust the transmit power of terminal 120 based on the erasure decisions from processor 272, as follows:

$$P_{eb}(n+1) = \begin{cases} P_{eb}(n) + \Delta P_{up} & \text{for an erased decision,} \\ P_{eb}(n) - \Delta P_{dn} & \text{for a non-erased decision,} \end{cases} \quad \text{Eq (7)}$$

where
$\Delta P_{up}$ is an up step size for an erased decision, and
$\Delta P_{dn}$ is a down step size a non-erased decision.

The $\Delta P_{up}$ and $\Delta P_{dn}$ step sizes may be set based on the target erasure rate, as follows:

$$\Delta P_{up} = \Delta P_{dn} \cdot \left(\frac{1 - Pr_{erasure}}{Pr_{erasure}}\right). \quad \text{Eq (8)}$$

Serving sector 110x may broadcasts the $\Delta P_{up}$ and/or $\Delta P_{dn}$ step sizes to the terminals within its coverage area. In a given deployment, the target erasure rate may change very slowly. Thus, the overhead of broadcasting the $\Delta P_{up}$ and/or $\Delta P_{dn}$ step sizes may be a small percentage of the total overhead.

Second loop 412 adjusts the erasure threshold based on received known codewords to achieve the target conditional error rate. Second loop 412 operates as described above for third loop 314 in FIG. 3.

First loop 410 and second loop 412 may operate at different rates. First loop 410 may be updated whenever a codeword is received. Second loop 412 may be updated whenever a known codeword is received.

In the designs shown in FIGS. 3 and 4, the desired level of performance is quantified by a target erasure rate and a target conditional error rate. Performance may also be quantified by other measures such as, e.g., a target false alarm probability, which is the probability is declaring a non-erased codeword when none was sent. The power control mechanisms may be designed in accordance with the measure(s) used to quantify performance.

Various factors may be considered in selecting either the up-down PC mode or the erasure-based PC mode for use. For example, a PC mode may be selected based on the target erasure rate, convergence rate, and/or other factors. The erasure-based PC mode may be similar to the up-down PC mode if the target erasure rate is 50%. These two PC modes may have different characteristics if the target erasure rate is something other than 50%. The erasure-based PC mode may be used to directly achieve the target erasure rate without using an outer loop. However, the use of different $\Delta P_{up}$ and $\Delta P_{dn}$ step sizes in the erasure-based PC mode may result in (1) slower convergence to the proper transmit power level and (2) a wider distribution of received SNR. The erasure rate may also be sensitive to errors in detecting the erasure indications, especially when targeting very high or very low erasure rates, e.g., 1% or 10%. The up-down PC mode utilizes equal up and down step sizes $\Delta P$ regardless of the target erasure rate. Consequently, the up-down PC mode may be able to achieve (1) faster convergence to the proper transmit power level and (2) a more narrow distribution of received SNR.

In one design, a PC mode may be selected for each terminal. In another design, a PC mode is selected for each sector and is used for all terminals served by that sector. In yet another design, a PC mode is selected for each group of sectors or an entire network. In all designs, the selected PC mode may be signaled to the terminal(s) via an overhead message parameter, e.g., the RLCtrlPCMode bit described above.

A terminal may ascertain the PC mode to use for power control by reading the overhead message parameter. If this parameter indicates the up-down PC mode, then the terminal may adjust its transmit power with equal up and down step sizes based on PC commands received from the serving sector. If the parameter indicates the erasure-based PC mode, then the terminal may treat the erasure indications from the serving sector as power control commands and may adjust its transmit power with different up and down step sizes based on the received erasure indications.

The RL power control described above allows for reliable operation of the control channel used to send the codewords. The transmit power of this control channel may be used as a reference power level for other control channels and data channels.

2. Erasure Detection

Erasure detection may be performed in various manners depending on how the codewords are generated and the metric selected for use. Several exemplary schemes for erasure detection are described below.

In one design, a terminal maps a CQI report (or a signaling message) of L bits to one of $2^L$ possible Walsh codes of length $2^L$. The terminal then transmits the mapped Walsh code as the codeword for the CQI report. The terminal may scramble the codeword prior to transmission. A sector receives the transmitted codeword and performs the complementary descrambling prior to detection of the codeword.

In one design, the sector performs detection by despreading the received codeword with each of the $2^L$ possible Walsh codes, as follows:

$$M_\ell(n) = \sum_{i=1}^{2^L} r(n, i) \cdot w_\ell(i), \quad \text{Eq (3)}$$

for $\ell = 1, \ldots, 2^L$, where r(n,i) is the i-th received sample in frame n,
$w_\ell(i)$ is the i-th chip of Walsh code$_\ell$, and
$M_\ell(n)$ is the metric value for Walsh code$_\ell$ in frame n.

The sector obtains $2^L$ metric values for the $2^L$ possible Walsh codes that could have been transmitted. The sector may compare each metric value against the erasure threshold, as follows:

If $M_\ell(n) > TH_{erasure}$, then declare detected Walsh code$_\ell$. Eq (4)

If the codeword was transmitted with sufficient power, then only one metric value will likely exceed the erasure threshold. In this case, the Walsh code for this metric value may be provided as the decoded word, and a non-erased codeword may be declared. However, if all $2^L$ metric values are below the erasure threshold, then an erased codeword may be declared. If multiple metric values exceed the erasure threshold, then an error event may be declared since only one Walsh code could have been transmitted. This error event may be due to noise and interference observed by the sector and may be more likely with a low erasure threshold.

In another design, the sector performs detection by computing the Euclidean distance between the received codeword and each of the $2^L$ possible valid codewords in the codebook, e.g., as shown in equation (9). The sector may then derive a metric as follows:

$$M(n) = \frac{d_1(n)}{d_2(n)}, \quad \text{Eq (11)}$$

where
$d_1(n)$ is the Euclidean distance between the received codeword in frame n and the nearest valid codeword, and
$d_2(n)$ is the Euclidean distance between the received codeword in frame n and the next nearest valid codeword.

The sector may then compare the metric against the erasure threshold, as follows:

If $M(n) < TH_{erasure}$, then declare a non-erased codeword, else

If $M(n) \geq TH_{erasure}$, then declare an erased codeword. Eq (12)

Other metrics may also be used for erasure detection. In general, a metric may be defined based on any reliability function $f(r,C)$, where r is a received codeword and C is a codebook of all possible codewords. The function $f(r,C)$ should be indicative of the quality/reliability of the received codeword and should have the proper characteristics, e.g., monotonic with detection reliability.

3. RL Handoff

Terminal 120 may use the erasure indications from serving sector 110x and non-serving sector 110a through 110m for RL handoff. Terminal 120 may determine the erasure rate observed by each sector for terminal 120 based on the erasure indications received from that sector. For each sector, terminal 120 may determine whether each erasure indication received from that sector indicates an erased codeword or a non-erased codeword. Terminal 120 may count the number of erased codewords within a predetermined time window to determine the erasure rate for the sector. Terminal 120 may identify the sector with the lowest erasure rate and may select this sector as the RL serving sector.

Terminal 120 may send a handoff request message to the current serving sector and/or the newly selected sector. In one design, terminal 120 sends a request for reverse link resources whenever terminal 120 wants to transmit on the reverse link. Terminal 120 may send this resource request to either (1) the current serving sector by applying an identification code for this sector or (2) the newly selected sector by applying an identification code for this new sector. The transmission of the resource request to the newly selected sector may be considered as a handoff request to the new sector. The handoff request may also be sent in other manners.

RL handoff may also be initiated by the system. In one design, the sectors in the active set of terminal 120 send erasure indications to a designated entity, e.g., system controller 130 in FIG. 1. The designated entity may determine the sector observing the best reverse link for terminal 120 and may select this sector as the RL serving sector for the terminal. The current serving sector and/or the newly selected sector may send signaling to terminal 120 to convey the RL handoff.

4. System

Figure 5:
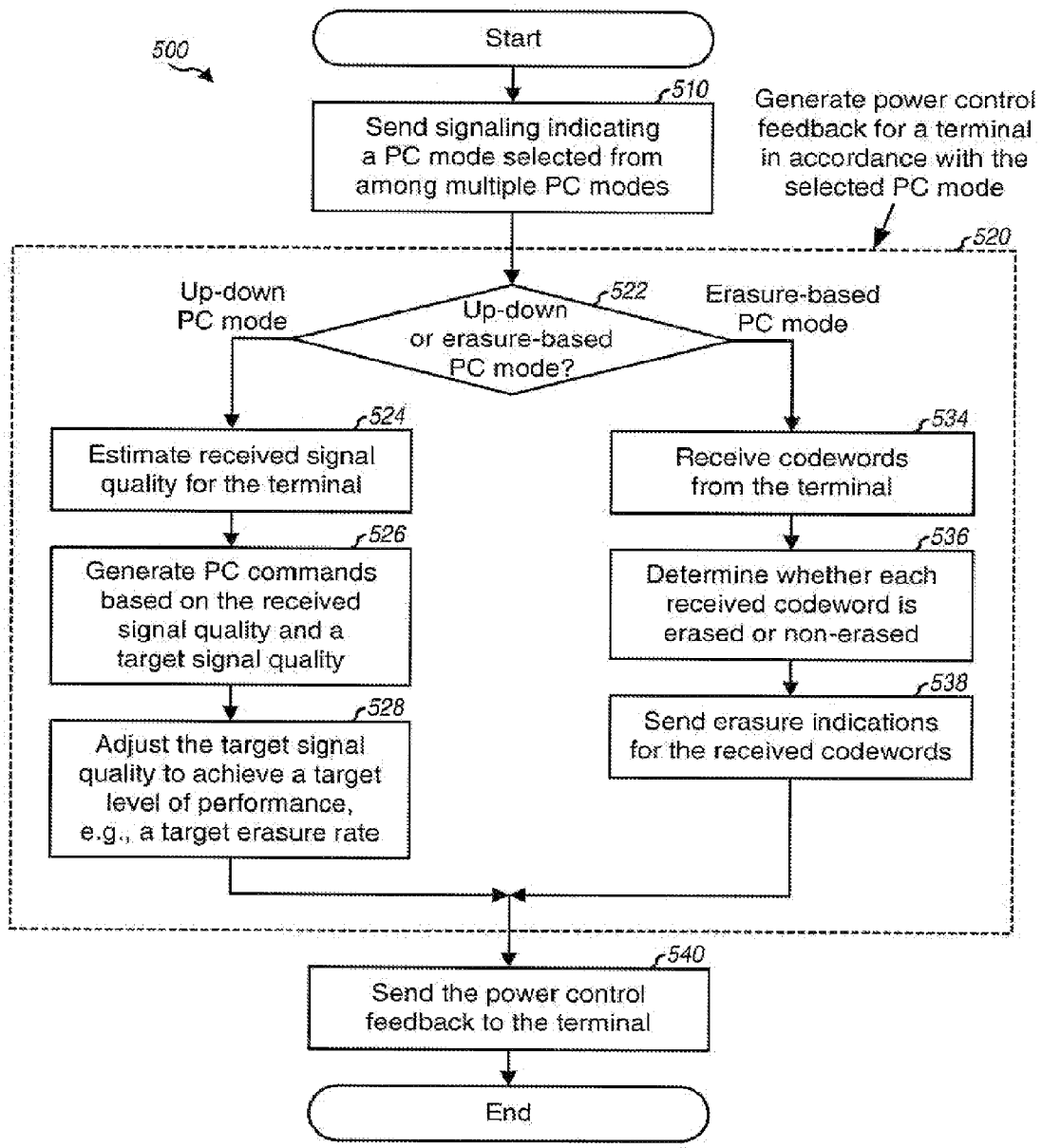
FIG. 5 shows a process performed by a base station for power control of a terminal.

FIG. 5 shows a design of a process 500 performed by a base station (e.g., a serving base station) for RL power control of a terminal. Signaling indicating a PC mode selected from among multiple PC modes is sent (block 510). The multiple PC modes may include the up-down PC mode, the erasure-based PC mode, and/or some other PC mode. The signaling may be an RLCtrlPCMode bit or some other type of signaling. Power control feedback for the terminal is then generated in accordance with the selected PC mode (block 520). The power control feedback is used to adjust the transmit power of the terminal and may comprise PC commands, erasure indications, and/or other information. The power control feedback is sent to the terminal (block 540). Up and/or down step sizes used for adjusting transmit power may also be sent to the terminal or broadcast to all terminals.

For block 520, a determination is made whether the up-down PC mode or the erasure-based PC mode is selected (block 522). If the up-down PC mode is selected, then the received signal quality for the terminal is estimated (block 524), and PC commands are generated based on the received signal quality and a target signal quality (block 526). The target signal quality may be adjusted to achieve a target level of performance, e.g., a target erasure rate (block 528). If the erasure-based PC mode is selected, then codewords are received from the terminal (block 534). Whether each received codeword is erased or non-erased is determined (block 536), and erasure indications for the received codewords are sent (block 538).

Figure 6:
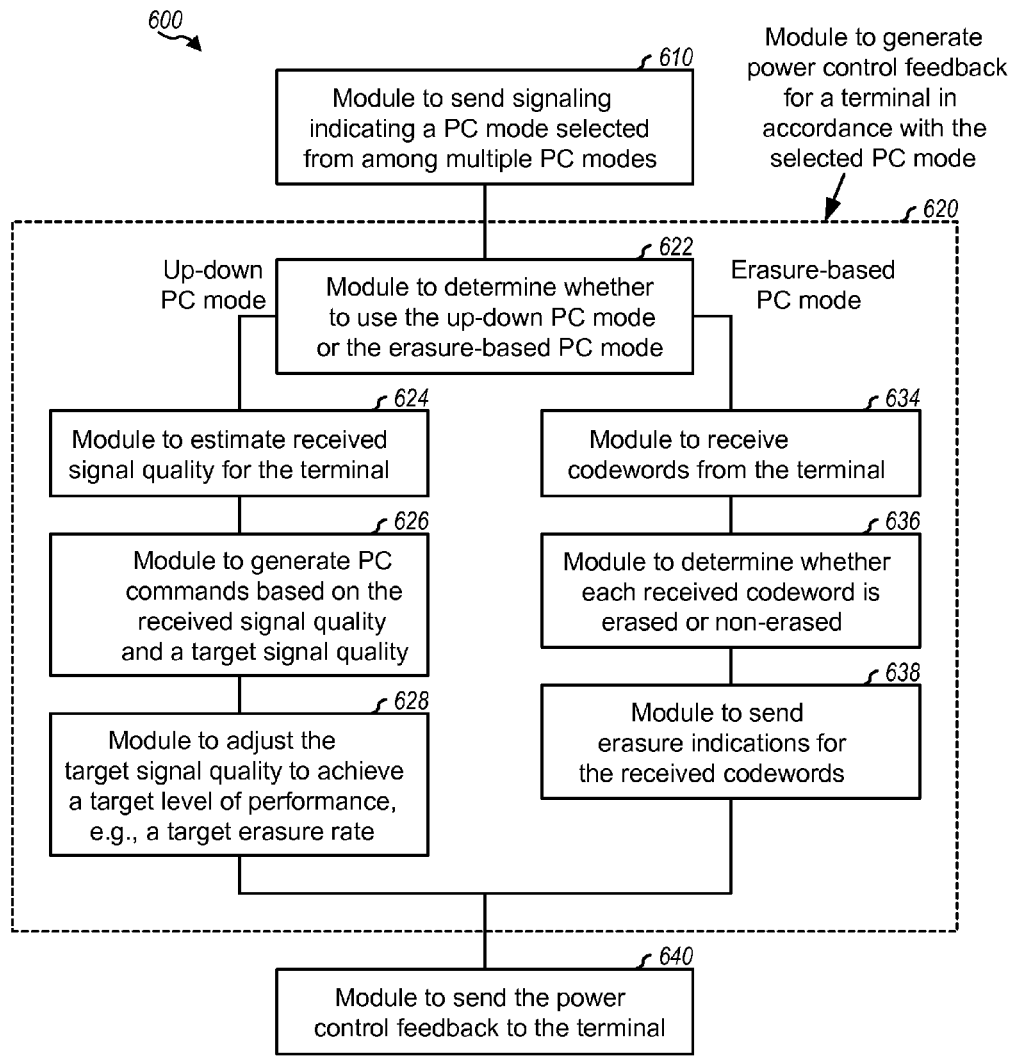
FIG. 6 shows an apparatus at a base station for power control of a terminal.

FIG. 6 shows a design of an apparatus 600 supporting RL power control for a terminal. Apparatus 600 includes means for sending signaling indicating a PC mode selected from among multiple PC modes (module 610), means for generating power control feedback for the terminal in accordance with the selected PC mode (module 620), and means for sending the power control feedback to the terminal (module 640). The means for generating power control feedback includes means for determining whether to use the up-down PC mode or the erasure-based PC mode (module 622). For the up-down PC mode, the means for generating power control feedback includes means for estimating the received signal quality for the terminal (module 624), means for generating PC commands based on the received signal quality and a target signal quality (module 626), and means for adjusting the target signal quality to achieve a target level of performance, e.g., a target erasure rate (module 628). For the erasure-based PC mode, the means for generating power control feedback includes means for receiving codewords from the terminal (module 634), means for determining whether each received codeword is erased or non-erased (module 636), and means for sending erasure indications for the received codewords (module 638). Modules 610 through 640 may comprise processors, electronics devices, hardware devices, electronics components, logical circuits, memories, etc., or any combination thereof.

Figure 7:
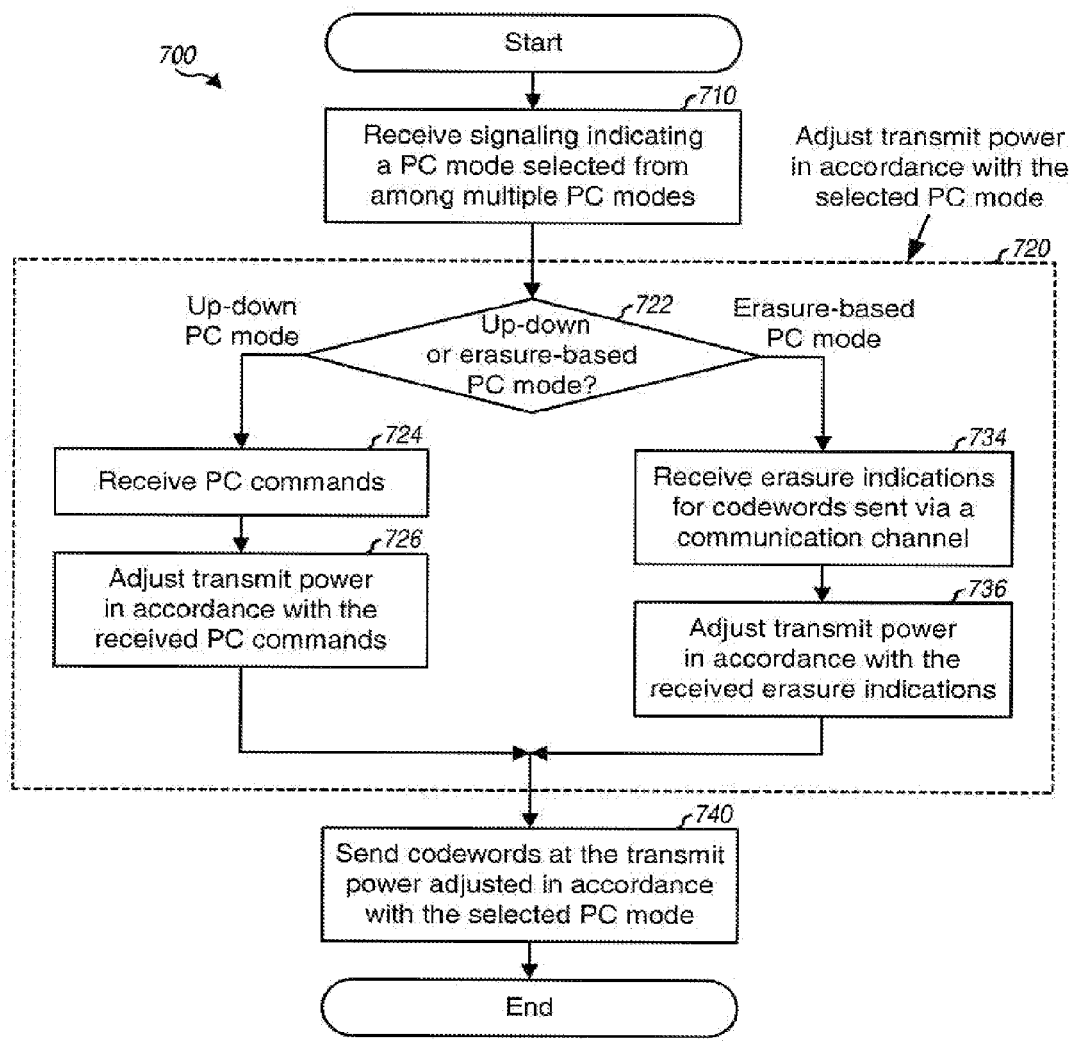
FIG. 7 shows a process performed by a terminal for power control.

FIG. 7 shows a design of a process 700 performed by a terminal for RL power control. Initially, signaling indicating a PC mode selected from among multiple PC modes is received (block 710). Transmit power is then adjusted in accordance with the selected PC mode (block 720).

For block 720, a determination is made whether the up-down PC mode or the erasure-based PC mode is selected (block 722). If the up-down PC mode is selected, then PC commands are received (block 724), and the transmit power is adjusted in accordance with the received PC commands (block 726). The transmit power may be (1) increased by an up step if a received PC command is an up command or (2) decreased by a down step if the received PC command is a down command. The up and down step sizes may be equal in the up-down PC mode. If the erasure-based PC mode is selected, then erasure indications are received for codewords sent via a communication channel (block 734), and the transmit power is adjusted in accordance with the received erasure indications (block 736). The transmit power may be (1) increased by an up step if a received erasure indication indicates an erased codeword or (2) decreased by a down step if the received erasure indication indicates a non-erased codeword. The up and down step sizes may be different in the erasure-based PC mode and may be selected based on the target erasure rate.

Codewords are sent at the transmit power adjusted in accordance with the selected PC mode (block 740). The transmit power for other transmissions may also be adjusted based on the transmit power for the codewords.

Figure 8:
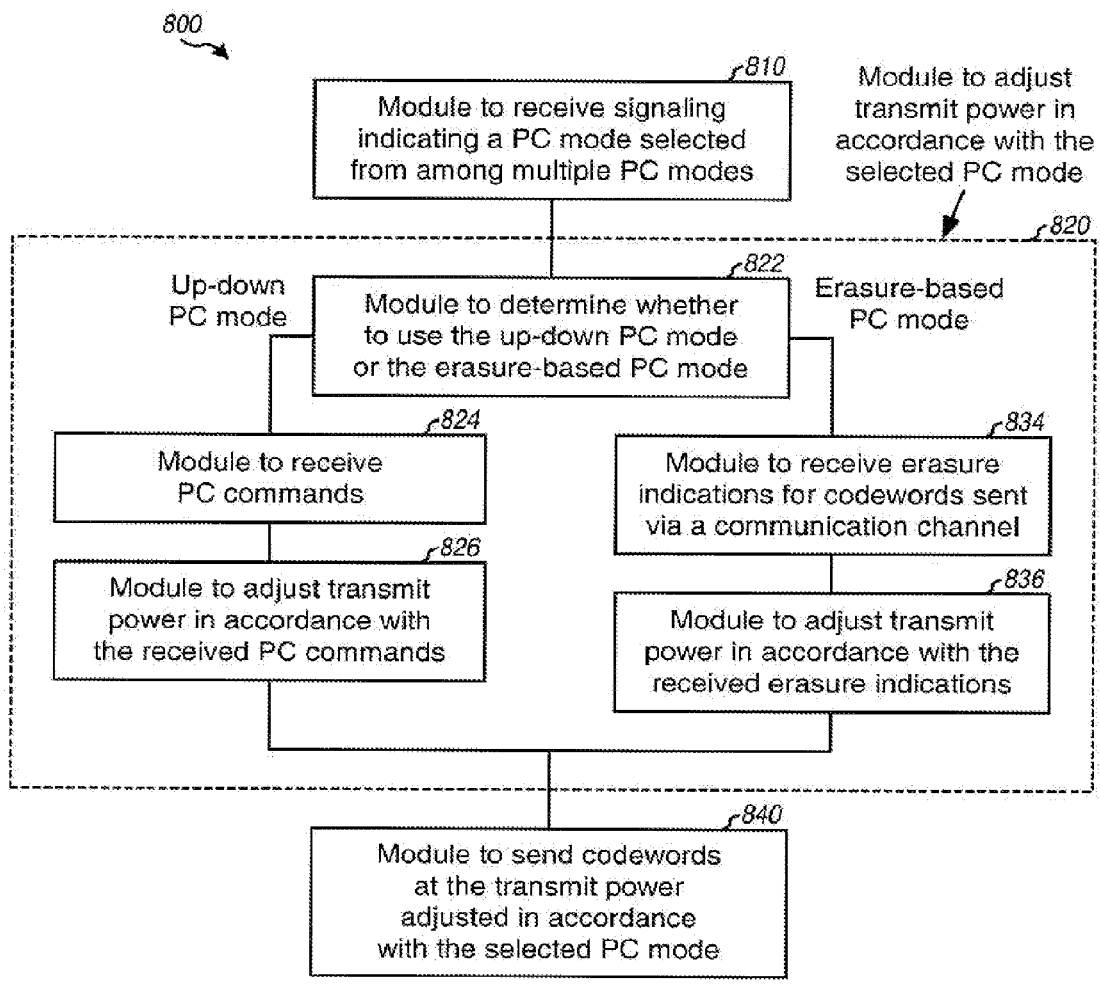
FIG. 8 shows an apparatus at a terminal for power control.

FIG. 8 shows a design of an apparatus 800 for performing RL power control for a terminal. Apparatus 800 includes means for receiving signaling indicating a PC mode selected from among multiple PC modes (module 810), means for adjusting transmit power in accordance with the selected PC mode (module 820), and means for sending codewords at the transmit power adjusted in accordance with the selected PC mode (module 840). The means for adjusting transmit power includes means for determining whether to use the up-down PC mode or the erasure-based PC mode (module 822). For the up-down PC mode, the means for adjusting transmit power includes means for receiving PC commands (module 824) and means for adjusting the transmit power in accordance with the received PC commands (module 826). For the erasure-based PC mode, the means for adjusting transmit power includes means for receiving erasure indications for codewords sent via a communication channel (module 834) and means for adjusting the transmit power in accordance with the received erasure indications (module 836). Modules 810 through 840 may comprise processors, electronics devices, hardware devices, electronics components, logical circuits, memories, etc., or any combination thereof.

Figure 9:
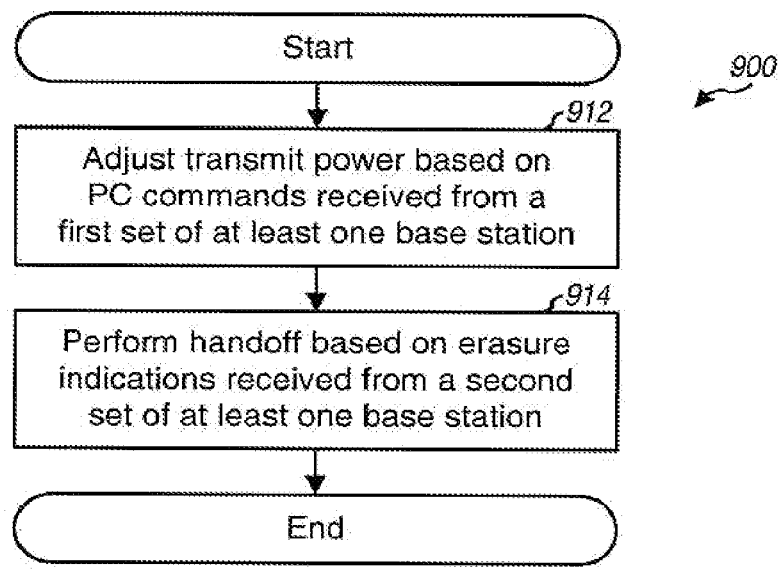
FIG. 9 shows a process for performing power control and handoff.

FIG. 9 shows a design of a process 900 performed by a terminal for RL power control and handoff. Transmit power is adjusted based on PC commands received from a first set of at least one base station (block 912). Handoff is performed based on erasure indications received from a second set of at least one base station (block 914). The first set may include only the serving base station. The second set may include the serving base station and possibly other base stations.

The terminal transmits codewords on the reverse link. For RL handoff, erasure indications for the codewords may be received from the second set of base station(s). An erasure rate may be determined for each base station in the second set based on the erasure indications received from that base station. The base station with the lowest erasure rate may be selected as a new serving base station, and handoff may be performed to the selected base station. For RL power control, the transmit power of the terminal may be increased by an up step if a received PC command is an up command or decreased by a down step if the received PC command is a down command.

Figure 10:
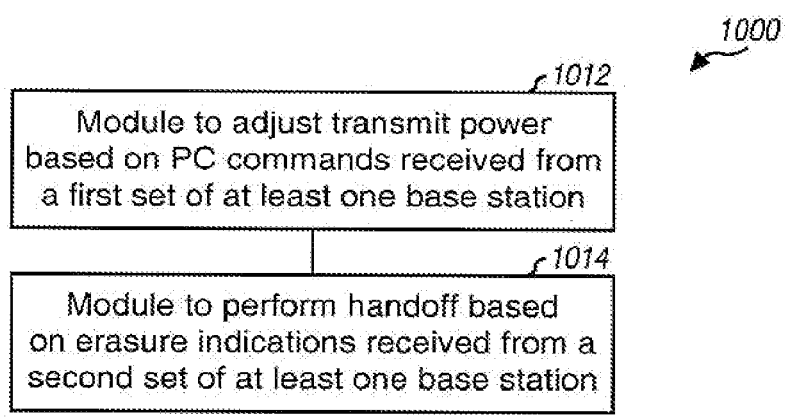
FIG. 10 shows an apparatus for performing power control and handoff.

FIG. 10 shows a design of an apparatus 1000 for performing RL power control and handoff. Apparatus 1000 includes means for adjusting transmit power based on PC commands received from a first set of at least one base station (module 1012) and means for performing handoff based on erasure indications received from a second set of at least one base station (module 1014). Modules 1012 and 1014 may comprise processors, electronics devices, hardware devices, electronics components, logical circuits, memories, etc., or any combination thereof.

Figure 11:
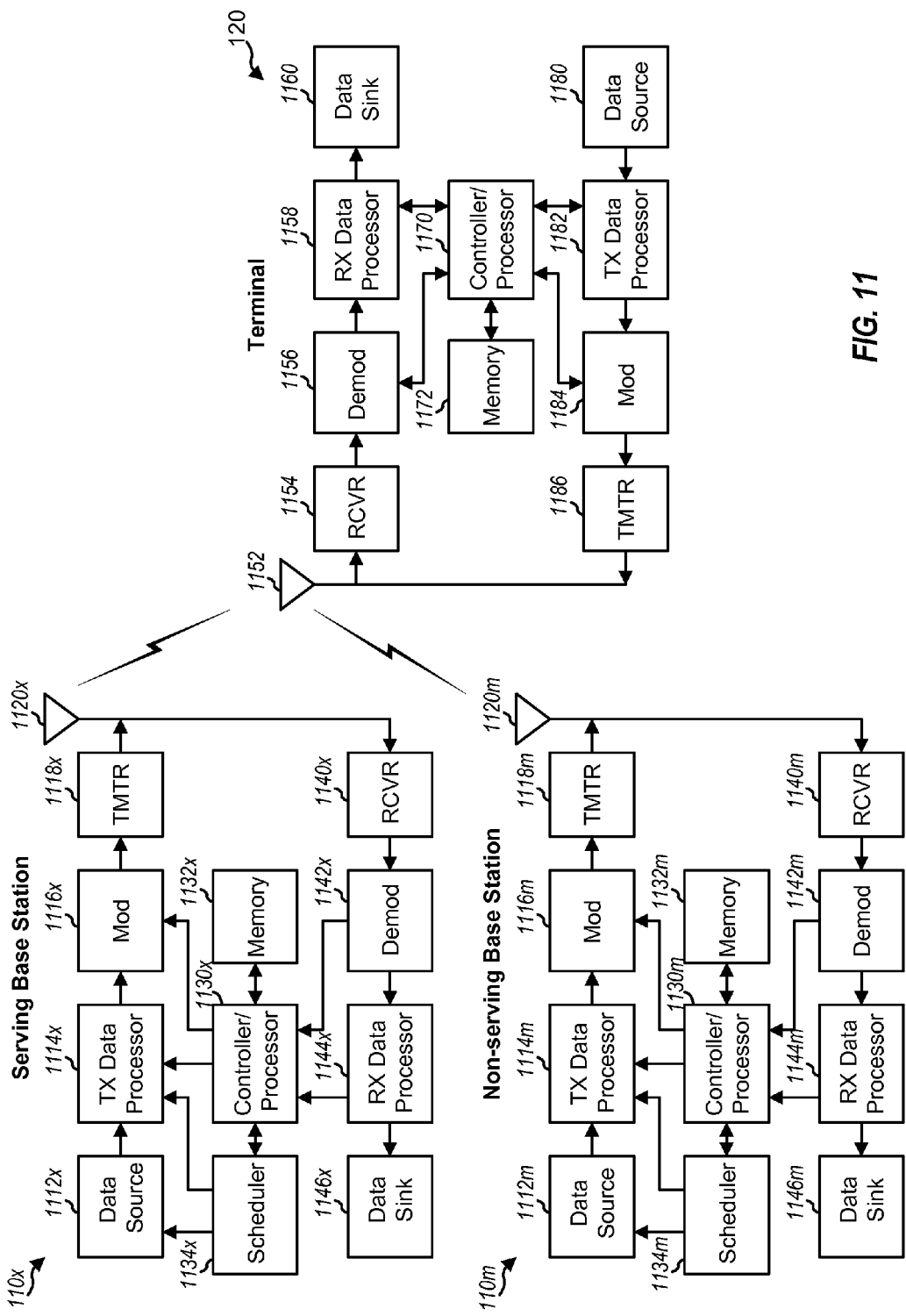
FIG. 11 shows a block diagram of a terminal and two base stations.

FIG. 11 shows a block diagram of a design of terminal 120, serving base station 110*x*, and non-serving base station 110*m* in FIG. 1. At serving base station 110*x*, a TX data processor 1114*x* receives traffic data from a data source 1112*x* and signaling from a controller/processor 1130*x* and a scheduler 1134*x*. Controller/processor 1130*x* may provide feedback (e.g., PC commands and/or erasure indications) to adjust the transmit power of the terminals communicating with base station 110*x*, and scheduler 1134*x* may provide assignments of data channels and/or subcarriers to the terminals. TX data processor 1114*x* processes (e.g., encodes, interleaves, and symbol maps) the traffic data and signaling and provides symbols. A modulator (Mod) 1116*x* performs modulation on the symbols (e.g., for CDMA, OFDMA, and/or other radio technologies) and provides output chips. A transmitter (TMTR) 1118x conditions (e.g., converts to analog, amplifies, filters, and frequency upconverts) the output chips and generates a forward link signal, which is transmitted via an antenna 1120x.

Non-serving base station 110m similar processes traffic data and signaling for terminals being served by base station 110m and terminals having base station 110m in their active sets. The traffic data and signaling are processed by a TX data processor 1114m, modulated by a modulator 1116m, conditioned by a transmitter 1118m, and transmitted via an antenna 1120m. Data source 1112m provides data to TX data processor 1114m. Receiver 1140m, Demodulator 1142m, RX data processor 1144m, and Data sink 1146m provide similar functions as those described for Receiver 1140x, Demodulator 1142x, RX data processor 1144x, and Data sink 1146x respectively.

At terminal 120, an antenna 1152 receives the forward link signals from base stations 110x and 110m and possibly other base stations. A receiver 1154 conditions (e.g., filters, amplifies, frequency downconverts, and digitizes) a received signal from antenna 1152 and provides samples. A demodulator (Demod) 1156 performs demodulation (e.g., for CDMA, OFDMA, and/or other radio technologies) and provides symbol estimates. An RX data processor 1158 processes (e.g., symbol demaps, deinterleaves, and decodes) the symbol estimates, provides decoded data to a data sink 1160, and provides detected signaling (e.g., RLCtrlPCMode bit, PC commands, erasure indications, and so on) to a controller/processor 1170.

On the reverse link, a TX data processor 1182 processes traffic data from a data source 1180 and signaling (e.g., codewords, handoff request, and so on) from controller/processor 1170 and generates symbols. The symbols are modulated by a modulator 1184 and conditioned by a transmitter 1186 to generate a reverse link signal, which is transmitted from antenna 1152. Controller 1170 may provide an indication of the transmit power level to use for transmission.

At serving base station 110x, the reverse link signals from terminal 120 and other terminals are received by antenna 1120x, conditioned by a receiver 1140x, demodulated by a demodulator 1142x, and processed by an RX data processor 1144x. Processor 1144x provides decoded data to a data sink 1146x and detected signaling (e.g., codewords) to controller/processor 1130x. Receiver 1140x may estimate the received signal quality for each terminal and may provide this information to controller/processor 1130x. Controller/processor 1130x may derive PC commands and/or erasure indications for each terminal, as described above. Non-serving base station 110m may similarly detect signaling (e.g., codewords and handoff request) sent by terminal 120 and may send erasure indications to the terminal.

Controllers/processors 1130x, 1130m and 1170 direct the operations of various processing units at base stations 110x and 110m and terminal 120, respectively. These controllers/processors may also perform various functions for power control and handoff. For example, controller/processor 1130x may implement some or all of units 220 through 232 shown in FIGS. 3 and 4 for base station 110x. Controller 1170 may implement some or all of units 258 through 290 shown in FIGS. 2 through 4 for terminal 120. Controller 1130x may also implement process 500 in FIG. 5. Controller 1170 may also implement processes 700 and/or 900 in FIGS. 7 and 9. Memories 1132x, 1132m and 1172 store data and program codes for base stations 110x and 110m and terminal 120, respectively. Schedulers 1134x and 1134m schedule terminals communicating with base stations 110x and 110m, respectively, and assign data channels and/or subcarriers to the scheduled terminals.

The techniques described herein may be implemented by various means. For example, these techniques may be implemented in hardware, firmware, software, or a combination thereof. For a hardware implementation, the processing units used to perform power control and handoff may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the techniques may be implemented with modules (e.g., procedures, functions, and so on) that perform the functions described herein. The firmware and/or software codes may be stored in a memory (e.g., memory 1132x, 1132m or 1172 in FIG. 11) and executed by a processor (e.g., processor 1130x, 1130m or 1170). The memory may be implemented within the processor or external to the processor.

Headings are included herein for reference and to aid in locating certain sections. These headings are not intended to limit the scope of the concepts described therein under, and these concepts may have applicability in other sections throughout the entire specification.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. An apparatus comprising:
   at least one processor coupled to a memory for storing instructions, configured to:
   adjust transmit power based on power control (PC) commands received from a first set of at least one base station, wherein the first set of at least one base station includes a serving base station,
   transmit codewords at the transmit power adjusted based on the received PC commands,
   receive a first set of erasure indications from the serving base station and a second set of erasure indications from a second set of at least one base station based on the transmitted codewords, wherein the second set of at least one base station includes one or more non-serving base stations and at least one neighboring base station,
   determine an erasure rate for each base station in the second set of at least one base station based on the second set of erasure indications, wherein the erasure rate is based on erased codewords and the non-erased codewords, and wherein the determined erasure rate is based on counting number of the erased codewords within a predetermined time window,
   identify a selected base station with a lowest erasure rate, and
   perform handoff to the selected base station.

2. The apparatus of claim 1, wherein the second set of at least one base station includes the at least one neighboring base station that receives interference from the apparatus, and the at least one neighboring base station is outside of an active set of base stations that comprises the serving base station and the one or more non-serving base stations.

3. The apparatus of claim 1, wherein each of the erased codeword is based on a result of decoding of the codeword when a desired level of confidence is not met, and each of the non-erased codeword is based on the result of decoding of the codeword when the desired level of confidence is met.

4. The apparatus of claim 1, wherein the at least one processor is configured to increase the transmit power by an up step if a received PC command is an up command, and to decrease the transmit power by a down step if the received PC command is a down command.

5. The apparatus of claim 1 further comprises to adjust the transmit power by an up power step size computed by a product of a down power step size and a first function of a target erasure rate in response to an erased decision based on the first set of erasure indications and the second set of erasure indications, and to adjust the transmit power by a down power step size computed by a product of an up power step size and a second function of the target erasure rate in response to a non-erased decision based on the first set of erasure indications and the second set of erasure indications.

6. The apparatus of claim 5, wherein the first function of the target erasure rate (TER) is a ratio of (1-TER) over TER.

7. The apparatus of claim 5, wherein the second function of the target erasure rate (TER) is a ratio of TER over (1-TER).

8. A method comprising:
adjusting transmit power based on power control (PC) commands received from a first set of at least one base station, wherein the first set of at least one base station includes a serving base station; and
transmitting codewords at the transmit power adjusted based on the received PC commands;
receiving a first set of erasure indications from the serving base station and a second set of erasure indications from a second set of at least one base station based on the transmitted codewords, wherein the second set of at least one base station includes one or more non-serving base stations and at least one neighboring base station;
determining an erasure rate for each base station in the second set of at least one base station based on the second set of erasure indications, wherein the erasure rate is based on erased codewords and the non-erased codewords, and wherein the determined erasure rate is based on counting number of the erased codewords within a predetermined time window;
identifying a selected base station with a lowest erasure rate; and
performing handoff to the selected base station.

9. The method of claim 8,
wherein each of the erased codeword is based on a result of decoding of the codeword when a desired level of confidence is not met, and each of the non-erased codeword is based on the result of decoding of the codeword when the desired level of confidence is met.

10. The method of claim 8 further comprises adjusting the transmit power by an up power step size computed by a product of a down power step size and a first function of a target erasure rate in response to an erased decision based on the first set of erasure indications and the second set of erasure indications, and adjusting the transmit power by a down power step size computed by a product of an up power step size and a second function of the target erasure rate in response to a non-erased decision based on the first set of erasure indications and the second set of erasure indications.

11. The method of claim 10, wherein the first function of the target erasure rate (TER) is a ratio of (1-TER) over TER.

12. The method of claim 10, wherein the second function of the target erasure rate (TER) is a ratio of TER over (1-TER).

13. An apparatus comprising:
means for adjusting transmit power based on power control (PC) commands received from a first set of at least one base station; and
means for transmitting codewords at the transmit power adjusted based on the received PC commands;
means for receiving a first set of erasure indications from the serving base station and a second set of erasure indications from a second set of at least one base station based on the transmitted codewords, wherein the second set of at least one base station includes one or more non-serving base stations and at least one neighboring base station;
means for determining an erasure rate for each base station in the second set of at least one base station based on the second set of erasure indications, wherein the erasure rate is based on erased codewords and the non-erased codewords, and wherein the determined erasure rate is based on counting number of the erased codewords within a predetermined time window;
means for identifying a selected base station with a lowest erasure rate; and
means for performing handoff to the selected base station.

14. The apparatus of claim 13,
wherein each of the erased codeword is based on a result of decoding of the codeword when a desired level of confidence is not met, and each of the non-erased codeword is based on the result of decoding of the codeword when the desired level of confidence is met.

15. The apparatus of claim 13 further comprises means for adjusting the transmit power by an up power step size computed by a product of a down power step size and a first function of a target erasure rate in response to an erased decision based on the first set of erasure indications and the second set of erasure indications, and means for adjusting the transmit power by a down power step size computed by a product of an up power step size and a second function of the target erasure rate in response to a non-erased decision based on the first set of erasure indications and the second set of erasure indications.

16. The apparatus of claim 15, wherein the first function of the target erasure rate (TER) is a ratio of (1-TER) over TER.

17. The apparatus of claim 15, wherein the second function of the target erasure rate (TER) is a ratio of TER over (1-TER).

18. A non-transitory readable media for storing instructions for execution by one or more processors, the instructions are operable to:
adjust transmit power based on power control (PC) commands received from a first set of at least one base station,
transmit codewords at the transmit power adjusted based on the received PC commands,
receive a first set of erasure indications from the serving base station and a second set of erasure indications from a second set of at least one base station based on the transmitted codewords, wherein the second set of at least one base station includes one or more non-serving base stations and at least one neighboring base station,
determine an erasure rate for each base station in the second set of at least one base station based on the second set of erasure indications, wherein the erasure rate is based on erased codewords and the non-erased codewords, and wherein the determined erasure rate is based on counting number of the erased codewords within a predetermined time window, identify a selected base station with a lowest erasure rate, and perform handoff to the selected base station.

19. The instructions of claim 18 further comprises instructions to adjust the transmit power by an up power step size computed by a product of a down power step size and a first function of a target erasure rate in response to an erased decision based on the first set of erasure indications and the second set of erasure indications, and to adjust the transmit power by a down power step size computed by a product of an up power step size and a second function of the target erasure rate in response to a non-erased decision based on the first set of erasure indications and the second set of erasure indications.

20. The instructions of claim 19, wherein the first function of the target erasure rate (TER) is a ratio of (1-TER) over TER.

21. The instructions of claim 19, wherein the second function of the target erasure rate (TER) is a ratio of TER over (1-TER).

* * * * *